United States Patent Office

3,518,053
Patented June 30, 1970

3,518,053
METHOD FOR PRODUCING AN IMPROVED TITANIUM DIOXIDE PIGMENT
George A. Kolznak, Red Bank, and Lancelot W. Row, Edison, N.J., assignors to National Lead Company, New York, N.Y., a corporation of New Jersey
No Drawing. Filed Apr. 16, 1968, Ser. No. 721,584
Int. Cl. C01g 23/04
U.S. Cl. 23—202                                              4 Claims

ABSTRACT OF THE DISCLOSURE

This invention relates to a process for producing rutile titanium doxide pigment having superior properties. The new and improved process of the instant invention includes treating a titanium hydrate with an ammoniacal substance to expand the bulk size of the hydrate by reducing the amount of soluble sulfate values contained therein before the titanim hydrate is calcined. The process of this invention also eliminates sulfur trioxide stack fumes which normally are released into the air when titanium dioxide hydrates are calcined. The sulfate values present in the titanium hydrate are neutralized with ammonium compounds thus producing ammonium sulfate which is removed by washing before calcination.

BACKGROUND OF THE INVENTION

Titanium dioxide pigments having the crystal structure of rutile have been produced by many prior art processes from a titanium sulfate solution. In such porcesses a titanium hydrate is usually formed by hydrolyzing a titanium sulfate-iron sulfate solution and the titanium hydrate so formed is washed and bleached thoroughly to remove the iron values. The bleached hydrate is then calcined at elevated temperatures to develop the necessary rutile crystal structure to produce the final pigment product. Various grades of pigment are produced by adding small amounts of treating agents before and after calcining to improve or alter the pigment properties.

In such processes the washed and bleached titanium hydrate contains from 5% to 10% $H_2SO_4$ absorbed thereon, calculated as $H_2SO_4$ on a $TiO_2$ basis. This $H_2SO_4$ is not removable from the titanium hydrate by washing.

In most of these prior art processes the $H_2SO_4$ is removed as $SO_3$ during the calcination step. Many claims have been made in the past that the presence of the $H_2SO_4$ in the hydrate is beneficial since the particles of $TiO_2$ are prevented from sintering together until after the $H_2SO_4$ is released as $SO_3$ at calcination temperatures above about 800–850° C. However it is also well known that the $TiO_2$ particles sinter together rapidly at these temperatures after the $SO_3$ has been released. The conversion of the anatase structure to the rutile structure also takes place after the release of the $SO_3$.

In such a process there is little or no control over the rapidity at which the $SO_3$ is released and therefore the degree of sintering is difficult to control.

SUMMARY OF THE INVENTION

The instant invention covers a process for producing a softer, less sintered titanium doxide pigment having improved properties which comprises hydrolyzng a titanium sulfate-iron sulfate solution to form a titanium hydrate, filtering, bleaching and washing said hydrate to remove the soluble iron values therefrom, said bleached hydrate being substantially iron free but containing from 5% to 10% $H_2SO_4$ associated with said hydrate, treating said bleached hydrate with a sufficient amount of an ammoniacal substance selected from the group consisting of ammonia, ammonium hydroxide and ammonium carbonate to neutralize from 50% to 95% of the $H_2SO_4$ present in said hydrate to form ammonium sulphate, washing said hydrate to remove said amonium sulfate and recovering therefrom said partially neutralized titanium hydrate containing from 0.5% to 2.0% sulfate, calculated as sulfuric acid, associated with said hydrate, and calcining the treated hydrate at the lowest temperature which produces at least 98.5% rutile.

DESCRIPTION OF THE PREFERRED EMBODIMENT

At first glance the process of the instant invention appears to be similar to various prior art processes but upon closer examination it will be apparent that the process of the instant invention is new and novel and is not taught by the prior art.

Attempts have been made in the past to neutralize the $H_2SO_4$ present in a titanium hydrate before calcination but these processes have failed to produce improved $TiO_2$ pigments.

It has been discovered that by neutralizing the hydrate in the particular manner of this invention the particle density or the surface area of the titanium hydrate may be altered in a beneficial way.

If a titanium hydrate containing 5% to 10% $H_2SO_4$ is treated with an ammonium compound to neutralize 50% to 95% of the $H_2SO_4$ the particle density of the hydrate will be lowered from 1.0–1.0 to 0.75–0.85 g./cc. The partially neutralized titanium hydrate apparently swells from its original size. If however the titanium hydrate containing the $H_2SO_4$ is neutralized completely the titanium hydrate begins to disperse in the slurry thus causing a breakdown in the floc size. The extent of neutralization, i.e. from 50% to 95% is critical in subsequently forming a superior type of titanium dioxide pigment.

It has been found that when this more bulky or less dense partially neutralized titanium hydrate is calcined at the lowest temperature to obtain at least 99.5% rutile, the calciner discharge is more bulky or less dense than a normal calciner discharge. Also this less dense calcined pigment is more easily ground than normal calciner discharge and its pigment properties are improved. It has been found that the optimum calcination temperatures used in this invention are from 15° C. to 25° C. lower than for normal pigment processes.

DETERMINATION OF PARTICLE DENSITY

As a measure of the bulkiness of the various titanium hydrates produced, the hydrates were subjected to a test which uses a mercury displacement apparatus for determining particle density. The apparatus used was similar to that described by C. J. Plank and L. C. Drake in an article entitled "Differences Between Silica and Silica-Alumina Gels" in Journal of Colloid Science, volume 2, 1947, on page 400.

It was found that the particle density of a prior art titanium hydrate was about 1.0–1.4 grams per cc. while the particle density of the expanded and partially neutralized titanium hydrate produced by this invention was only about 0.75–0.85 gram per cc. The particle densities of the calciner discharges are lower than those obtained when the titanium hydrate has not been neutralized prior to calcination.

The pigment properties were determined by the following test methods:

TINTING STRENGTH AND SPECTRAL CHARACTERISTIC DETERMINATIONS

The pigment was mixed with a soya alkyd vehicle containing carbon black and the mixture was formed into a paste. The ratio of the pigment to carbon black present in the paste was 3.0 to 0.09. The paste was then spread onto a lacquered sheet and the wet film was immediately tested in the Colormaster colorimeter referred to below. The blue, red and green reflectance values were obtained. The tinting strength of the pigment was determined by comparing the green reflectance values obtained with the green reflectance values of standard pigments which previously had been determined and placed on a tinting strength scale. The spectral characteristic of the pigment was measured by comparing the result obtained by subtracting the blue from the red reflectance values and comparing this result with the spectral characteristic of a standard pigment previously determined.

The chalk resistance of the pigment was determined by the method described by A. E. Jacobsen, in an article in Industrial and Engineering Chemistry, volume 41, page 523, March 1949.

The percentages rutile was determined by well known X-ray diffraction methods.

The oil absorption was determined by the method described in detail in Physical and Chemical Examination of Paints, Varnishes and Lacquers, Gardner and Sword, 10th edition, page 289, May 1946.

A titanium sol of the type used as a rutile promoter in the methods of the prior art was prepared as follows:

PREPARATION OF A TITANIUM SOL

A titanium tetrachloride solution equivalent to 100 g.p.l. $TiO_2$ was added simultaneously with 100 g.p.l. sodium hydroxide solution into a vessel with vigorous agitation. The pH of the mixture was maintained between 6 and 7. Through an outlet in the bottom of the vessel, the reaction product was withdrawn continuously at an average rate of 170 ml. per minute at 45° C. temperature. The slurry was filtered and washed thoroughly to remove the soluble chlorides. The washed filter cake was repulped, diluted to 40 g.p.l. $TiO_2$, charged into a vessel equipped with a reflux condenser, heated to 85° C. at the rate of 1° C. per minute and cured at 85° C. for 30 minutes in the presence of hydrochloric acid which was added to the vessel. The amount of HCl used was sufficient to obtain an $HCl/TiO_2$ ratio of 0.3. The titanium sol was formed during the curing operation and, after heating, was quenched immediately in a cold water bath. A thin, translucent titanium sol was obtained having the following analysis:

| | |
|---|---|
| $TiO_2$ (g.p.l.) | 39.7 |
| HCl (g.p.l.) | 11.5 |
| $HCl/TiO_2$ ratio | 0.29 |
| Rutile percent | 20 |
| Particle size (A.) | 50–900 |

A more detailed description of the instant invention is described by presenting the following examples:

EXAMPLE 1

This example is presented to show the effect in using a partially neutralized titanium hydrate for the preparation of high tinting strength rutile pigment.

A titanium hydrate was prepared by adding a titanium sulfate solution to hot water and boiling the mixture. The titanium sulfate solution used had the following analysis:

| | |
|---|---|
| $TiO_2$ (g.p.l.) | 250 |
| $H_2SO_4$ (g.p.l.) | 500 |
| $FeSO_4$ (g.p.l.) | 169 |
| $H_2SO_4/TiO_2$ | 2.0 |
| Spec. gravity (at 60° C.) | 1.675 |

3000 ml. of this titanium solution heated to 96° C. were added to 750 ml. water heated to 96° C. within a period of 16 minutes. The entire mixture was heated to boiling and boiled for 3 hours to complete the hydrolysis. 790 ml. of hot water were added to the mixture to cut the concentration to 165 g.p.l. $TiO_2$.

The hydrate was filtered, washed free from soluble iron salts, bleached with 10% $H_2SO_4$ and 0.1% aluminum metal for 1 hour at 80° C. at 20% solids, then filtered and washed with water until iron free. The filter cake contained 10% $H_2SO_4$, calculated on a $TiO_2$ basis. 1420 grams of the filter cake containing 35% solids were admixed with 1080 ml. water to form a slurry containing 20% solids. With agitation 25 grams of ammonia, added as ammonium hydroxide, were added to the hydrate slurry to neutralize 90% of the sulfuric acid present in the hydrate. The pH of the neutralized hydrate was 6.7.

The neutralized solids were then allowed to settle and the solids content were washed with 2500 ml. of water. The washed titanium hydrate contained 1.13% sulfate calculated as $H_2SO_4$ on a $TiO_2$ basis. The particle density of neutralized hydrate (on a dry basis) was 0.8040 g./cc. as compared to 1.0408 g./cc. before neutralization.

The washed titanium hydrate was then treated with 2.0% of a rutile promoter sol, 0.2% $K_2O$ was added as KOH and 0.05% $P_2O_5$ added as $H_3PO_4$ and the treated hydrate was calcined at 871° C. for 3.0 hours to produce a calcined pigment having a rutile content of 99.8%. The calcined material was then wet milled and treated with 1.0% $TiO_2$ added as $TiOSO_4$ and 3.0% $Al_2O_3$ added as $Al_2(SO_4)_3$. The treated pigment was then dried and air micronized.

The pigment had the following properties:

| | |
|---|---|
| Calcination temperature and time (hrs. at 871° C.) | 3.0 |
| Tinting strength | 1760 |
| Oil absorption | 19.4 |
| Spectral characteristic | 3.1 |
| Percent rutile | 99.8 |
| Particle density (g./cc.) | 1.1559 |

For comparison a similar titanium hydrate was prepared and without neutralizing was processed in the same manner as that described for the neutralized hydrate. In this case however the unneutralized hydrate had to be calcined at a temperature of 893° C. for 3 hours to obtain 99.8% rutile. This calcination temperature is 22° C. higher than that employed for the neutralized hydrate. The calcined material was treated in the same manner as that described above.

This pigment had the following properties:

| | |
|---|---|
| Calcination temperature and time (hrs. at 893° C.) | 3.0 |
| Tinting strength | 1720 |
| Oil absorption | 18.9 |
| Spectral characteristic | 2.7 |
| Percent rutile | 99.8 |
| Particle density (g./cc.) | 1.1665 |

EXAMPLE 2

This example is presented to show the effect in using a partially neutralized titanium hydrate for the preparation of a rutile pigment which is highly resistant to chalking.

In this example the titanium hydrate was prepared and neutralized in the same manner as that described in Example 1.

The washed and neutralized titanium hydrate was then treated with 3.0% of a rutile promoter sol, 0.2% $K_2O$ added as KOH, 0.1% $P_2O_5$ added as $H_3PO_4$ and 1.0% ZnO added as ZnO powder and the treated hydrate was then calcined at 800° C. for 3.0 hours, to produce a calcined pigment having a rutile content of 99.7%. The calcined material was then wet milled and treated with 1.07% $TiO_2$ added as $TiOSO_4$, 0.8% $SiO_2$ added as "N Brand sodium silicate" and 2.2% $Al_2O_3$ added as $Al_2(SO_4)_3$. The treated pigment was then dried and air micronized.

The pigment had the following properties:

| | |
|---|---|
| Calcination temperature and time (hrs. at 800° C.) | 3.0 |
| Tinting strength | 1740 |
| Oil absorption | 18.9 |
| Spectral characteristics | 2.0 |
| Percent rutile | 99.7 |
| Particle density | 1.2435 |

Again for comparison purposes, a similar titanium hydrate was prepared and without neutralizing was processed in the same manner as that described in Example 2 for the neutralized hydrate. In this case however the unneutralized hydrate has to be calcined at a temperature of 825° C. for 3.0 hours to obtain 99.7% rutile. This calcination temperature is 25° C. higher than that employed for the neutralized hydrate. The calcined material was treated in the same manner as that described above.

| | |
|---|---|
| Calcination temperature and time (hrs. at 825° C.) | 3.0 |
| Tinting strength | 1705 |
| Oil absorption | 18.9 |
| Spectral characteristics | 1.5 |
| Percent rutile | 99.7 |
| Particle density | 1.3539 |

Ammonium carbonate and ammonia gas have been substituted for the ammonium hydroxide with equal effectiveness.

From the examples it has been shown that a lower calcination temperature may be employed to produce the same rutilization, thus resulting in a calcine which is easier to grind. The product also has improved tinting strength and spectral characteristics.

In addition substantially no sulfur trioxide fumes are released to the atmosphere, when the titanium hydrate is neutralized before calcination.

While this invention has been described and illustrated by the examples shown, it is not intended to be strictly limited thereto, and other variations and modifications may be employed within the scope of the following claims.

We claim:

1. A method for producing a softer, less sintered rutile titanium dioxide pigment having improved pigmentary properties which comprises hydrolyzing a titanium sulfate-iron sulfate solution to form a titanium hydrate, filtering, bleaching and washing said hydrate to remove the soluble iron salts therefrom, said bleached hydrate being substantially iron free but containing from 5% to 10% $H_2SO_4$ associated with said hydrate, said hydrate having a particle density of about 1.0–1.4 g./cc., adding to said hydrate sufficient amount of an ammoniacal substance selected from the group consisting of ammonia, ammonium hydroxide and ammonium carbonate to expand the bulk density of the hydrate by decreasing the particle density to about 0.75–0.85 g./cc. and to react with from 50% up to but not exceeding 95% of the $H_2SO_4$ present to form ammonium sulfate, washing said hydrate to remove the ammonium sulfate and recovering therefrom said partially neutralized titanium hydrate containing from 0.5% to 2.0% sulfate, calculated as sulfuric acid, and treating the washed titanium hydrate with 2.0%–3.0% of a rutile promoter sol, calcining said hydrate at a low temperature to form a rutile titanium dioxide pigment containing about 99.7% rutile, said temperature being 15°–25° C. lower than for calcination employed for the hydrate if unneutralized as stated supra to form a rutile titanium dioxide pigment of said purity.

2. Process according to claim 1 in which the ammoniacal substance employed is ammonium hydroxide.

3. Process according to claim 1 in which the ammoniacal substance employed is ammonia.

4. Process according to claim 1 in which the ammoniacal substance employed is ammonium carbonate.

References Cited

UNITED STATES PATENTS

| | | | |
|---|---|---|---|
| 1,361,867 | 12/1920 | Jebsen | 23—202 |
| 2,055,221 | 9/1936 | Ravnestad | 23—202 XR |
| 2,069,554 | 2/1937 | Monk et al. | 23—202 |
| 2,766,133 | 10/1956 | Marcot et al. | 23—202 XR |
| 2,817,595 | 12/1957 | Kalinowski | 23—202 XR |
| 3,071,439 | 1/1963 | Solomka | 23—202 |
| 3,091,515 | 5/1963 | Dantro et al. | 23—202 |
| 3,337,300 | 8/1967 | Hughes | 23—202 |
| 3,403,977 | 10/1968 | Heywood et al. | 23—202 |

EDWARD STERN, Primary Examiner

U.S. Cl. X.R.

106—300